Sept. 23, 1969     C. P. NANNEY ET AL     3,468,436

MACHINE FOR PALLETIZING SOFT DRINK CASES

Filed July 7, 1967     11 Sheets-Sheet 4

INVENTORS
O. O. MOORE
C. P. NANNEY

BY

ATTORNEY

Sept. 23, 1969  C. P. NANNEY ET AL  3,468,436
MACHINE FOR PALLETIZING SOFT DRINK CASES
Filed July 7, 1967  11 Sheets-Sheet 5

INVENTORS
O. O. MOORE
C. P. NANNEY

BY

ATTORNEY

Sept. 23, 1969 C. P. NANNEY ETAL 3,468,436
MACHINE FOR PALLETIZING SOFT DRINK CASES
Filed July 7, 1967 11 Sheets-Sheet 6

INVENTORS
O. O. MOORE
C. P. NANNEY

BY

ATTORNEY

FIG. 10

Sept. 23, 1969   C. P. NANNEY ET AL   3,468,436
MACHINE FOR PALLETIZING SOFT DRINK CASES
Filed July 7, 1967   11 Sheets-Sheet 8

INVENTORS
O. O. MOORE
C. P. NANNEY
BY
ATTORNEY

Sept. 23, 1969  C. P. NANNEY ETAL  3,468,436
MACHINE FOR PALLETIZING SOFT DRINK CASES
Filed July 7, 1967  11 Sheets-Sheet 9

INVENTORS
O. O. MOORE
C. P. NANNEY

BY

ATTORNEY

FIG. 15

United States Patent Office 3,468,436
Patented Sept. 23, 1969

3,468,436
MACHINE FOR PALLETIZING SOFT DRINK CASES
Charles P. Nanney and Ollis O. Moore, Gastonia, N.C., assignors to Sun Drop Bottling Co., Inc., Gastonia, N.C., a corporation of North Carolina
Filed July 7, 1967, Ser. No. 651,765
Int. Cl. B65g 57/00
U.S. Cl. 214—6    6 Claims

ABSTRACT OF THE DISCLOSURE

This invention pertains to the handling of cases of uniform dimension such as used in the soft drink industry for conveying a plurality of bottles, and more particularly to a machine for sequentially receiving the cases or other uniformly dimensioned articles on an incoming conveyor, removing the cases from the conveyor, transferring them to a storage pallet, ejecting a loaded pallet from the loading area, and positioning a new pallet therein.

BACKGROUND OF THE INVENTION

During the course of the soft drink bottling operation, it becomes necessary to load a plurality of cases filled with soft drink bottles onto pallets, whereupon the loaded pallet is moved to some other location for storage previous to shipment to distributors. This can be carried out in a various number of ways; originally it was done manually by operators stacking the soft drink cases upon pallets as they come off the conveyor system.

However, as the demand for soft drinks increased, and the output of bottling plants rose to meet the increased demand, it became imperative for the manual stacking of soft drink cases to be replaced by automatic means. Various methods of carrying this out have been developed, and have met with varying degrees of success.

One method is disclosed in the Smith et al. Patent No. 1,490,235 which is in reality a method of handling bricks, but is also somewhat applicable to the handling of soft drink cases. In this machine, it is necessary for a workman to manually manipulate a crane and gripping device over a course of bricks to be lifted, then lower the crane which grips the bricks, lifts them, and moves them to some other location. This is undesirable in a mass production type layout, because it requires a workman at all times to operate the crane.

Another common type device is disclosed in the Locke et al. Patent No. 2,875,907 wherein the machine in each cycle handles preformed layers or courses of units such as boxes and cartons in succession and stacks them successively onto a pallet, feeding them horizontally over the pallet and depositing them on an empty pallet or on a previous layer. Then the conveyor unit itself is elevated to different levels to build a multi-tiered stack of multi-unit layers of cartons. This particular method is suitable for goods that are relatively stable and not subject to breakage, however soft drink bottles must be handled with considerably more care in their stacking procedures, because of the likelihood of bottle breakage. Moreover, this device is relatively expensive and to elevate an entire section of the conveyor itself requires a relatively heavy-duty motor.

Various other devices have been developed, but are all undesirable from the standpoint of soft drink handling, because of the handling care required, and yet the most economic and automatic system possible is desired.

SUMMARY OF THE INVENTION

The present invention, therefore, is directed to an automatic palletizer for cases of soft drinks, which involves an apparatus which performs the steps of: bunching an incoming line of cases and shifting the first line over to a position parallel with said first position; receiving a second line of cases in said first position; lifting, moving and stacking both lines of cases onto a pallet; repeating the previous steps until the pallet is completely loaded; then automatically removing the loaded pallet from the pallet loading area; and replacing it with an empty pallet. The pick-up mechanism includes a plurality of gripping elements and a pressure switch which activates an elevating motor when sufficient pressure is applied to the sides of the cases to securely hold them above the level of the receiving station. The pick-up mechanism is controlled by an automatic indexing means which allows the pick-up mechanism to rise only one tier at a time after depositing each layer on the pallet, so that excessive vertical movement of the pick-up mechanism during each stacking cycle is eliminated. The pallet loading device automatically replaces a filled pallet with an empty one from a pallet magazine after six tiers of cases have been stacked.

Therefore, the present invention eliminates the necessity of stationing an operator permanently at the palletizing machine to operate or observe the operation, and the palletizing machine also handles the soft drink cases with sufficient care to minimize breakage during the palletizing operation.

It is therefore an object of this invention to provide an automatic palletizing machine which loads soft drink cases onto a pallet without requiring the presence of an operator.

It is also an object of this invention to provide a palletizing machine that handles soft drink cases with the care and delicacy required to eliminate breakage of the bottles.

It is also an object of this invention to provide a palletizing machine which receives incoming cases of bottled soft drinks, stacks them upon an empty pallet, and removes the filled pallet and replaces it with an empty one.

It is a still further object of this invention to provide a palletizing machine that includes a pick-up mechanism in which the elevating means is activated only when sufficient pressure has been applied to the sides of the cases by the gripping members to securely hold them during a subsequent lifting operation by the pick-up mechanism.

It is yet another object of this invention to provide a palletizing machine that includes an indexing means which causes the pick-up mechanism to rise during each cycle only enough to provide clearance above the previously stacked course or tier of filled cases, and a control means which automatically signals the pallet removing mechanism to remove a filled pallet when the desired number of tiers of cases have been placed upon the pallet.

Another object of this invention is to provide a palletizing machine which includes a control mechanism for automatically positioning an empty pallet from a pallet magazine upon removal of a filled pallet from the pallet loading area.

It is a still further object of this invention to provide a palletizing machine which includes a shifting device for moving a desired number of incoming cases from a first position at the end of the conveyor line horizontally to a second position parallel to the first, so that a double line of incoming cases are positioned in the receiving station preparatory to being releasably clamped and transferred from the receiving station to the pallet.

Further objects and advantages are within the scope of this invention such as relate to arrangement, operation and function of the related elements of the structure and various details of construction as will be apparent from a consideration of the specification and drawing of the illustrated embodiment of the invention.

The operation of the machine and objects of the invention may be better understood in connection with a complete description which will be given in connection with the drawings wherein.

DESCRIPTION OF THE PREFERRED EMBODIMENT

Figure 1:
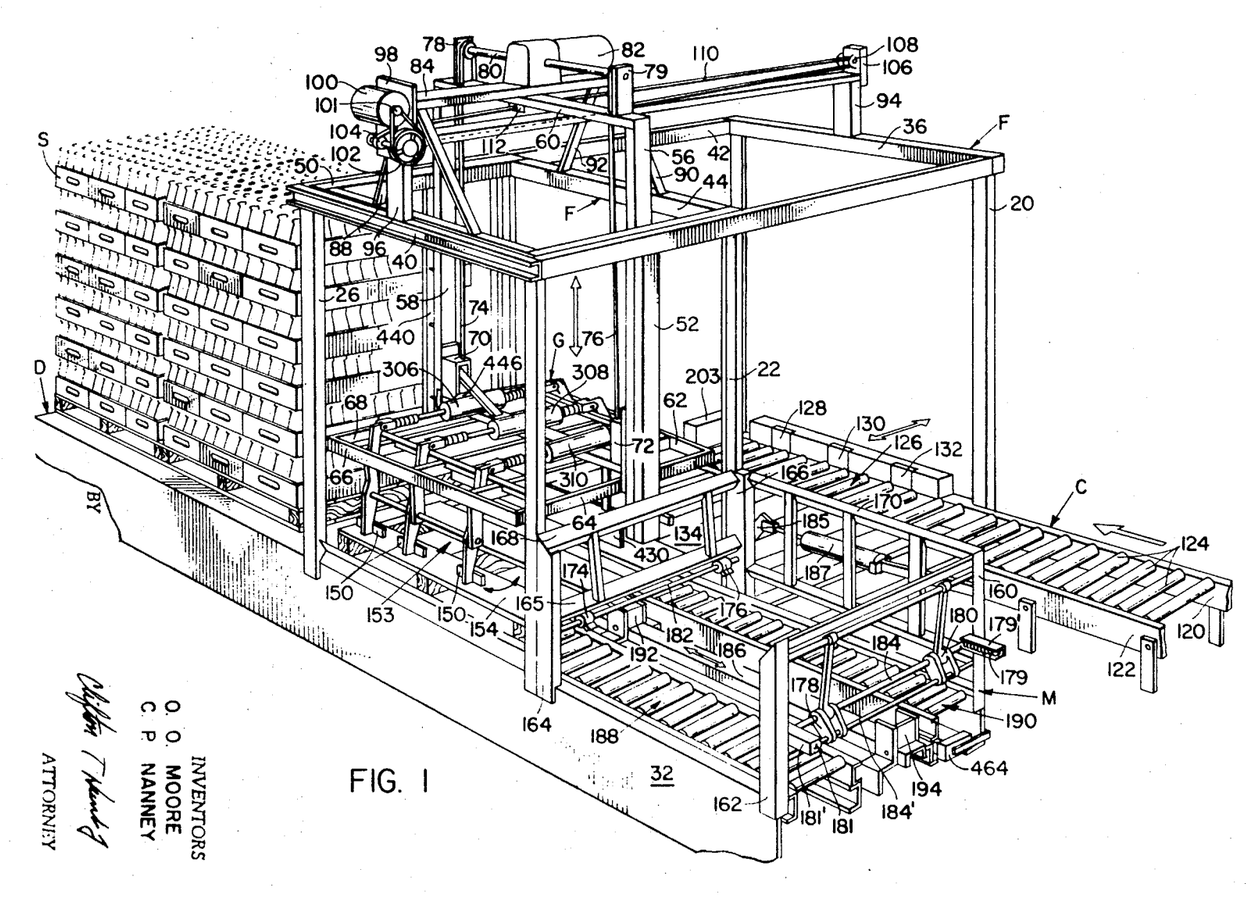
FIGURE 1 is a perspective view of the palletizer according to the present invention.
Figure 2:
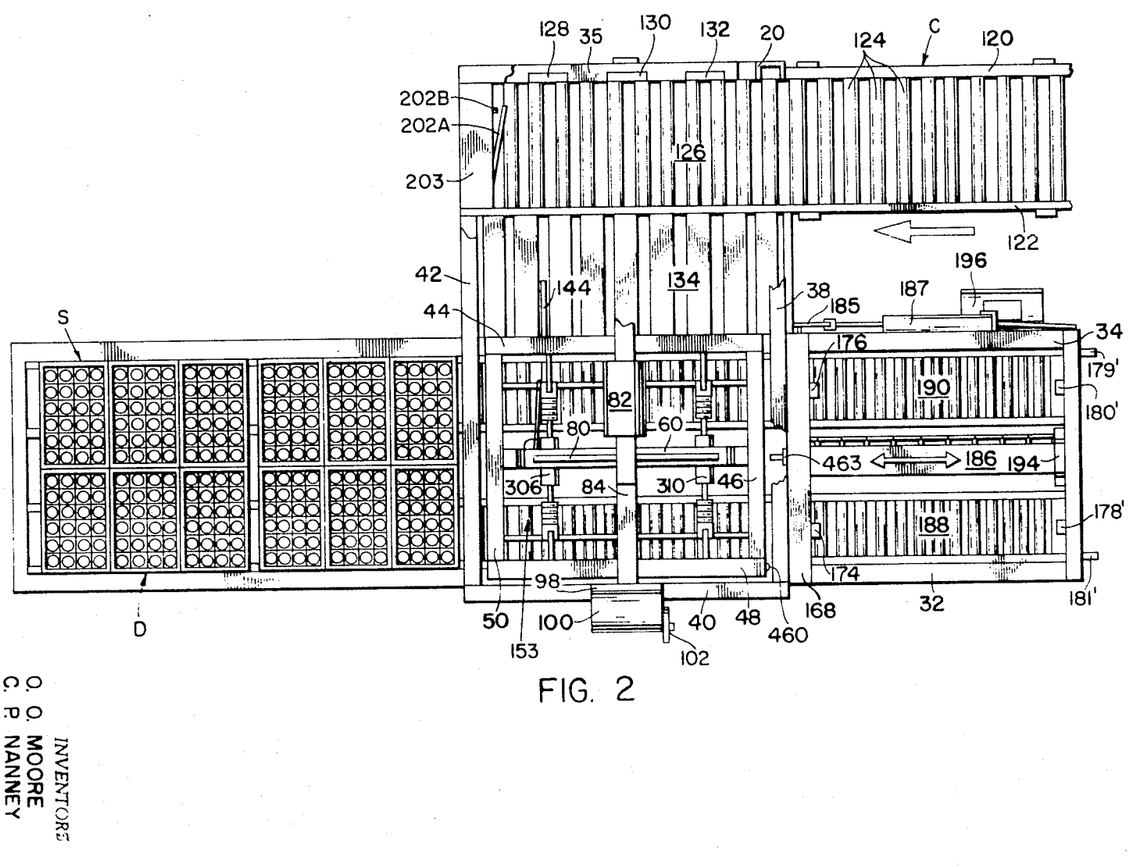
FIGURE 2 is a plan view of the palletizer illustrated in FIGURE 1.
Figure 3:
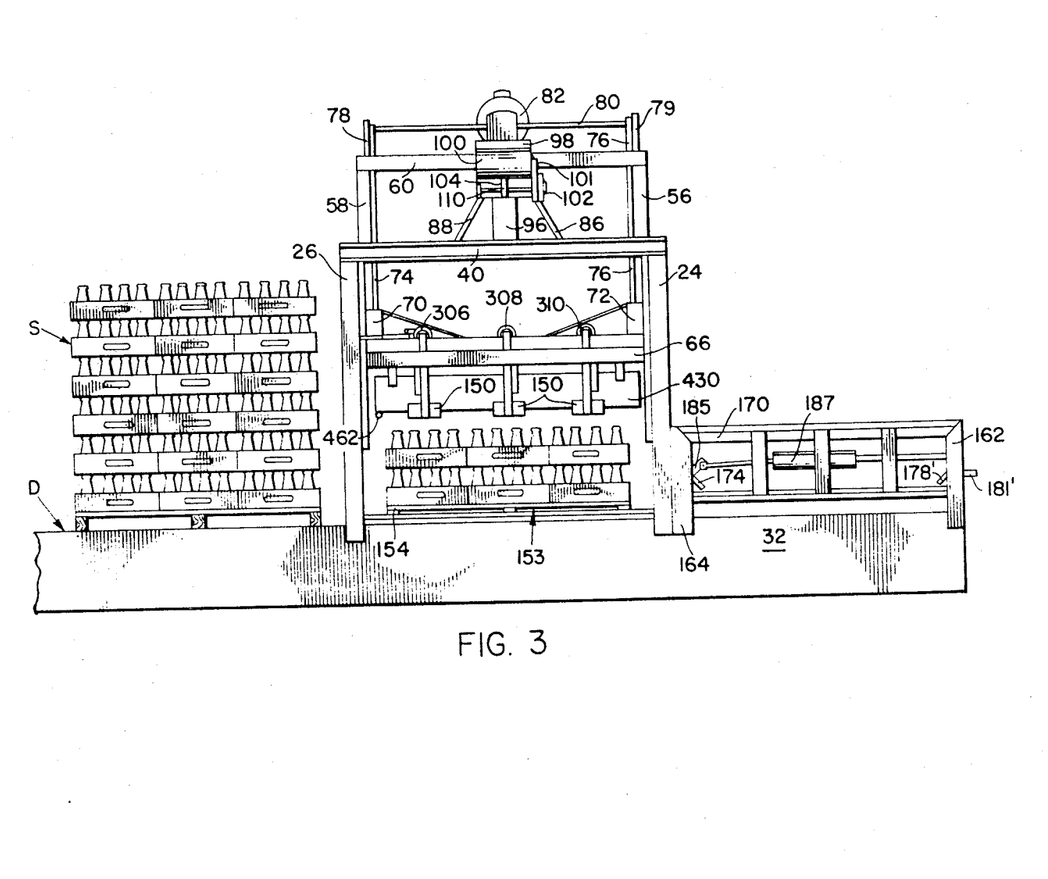
FIGURE 3 is a side elevation looking at the left-hand side of the palletizer illustrated in FIGURE 1.
Figure 4:
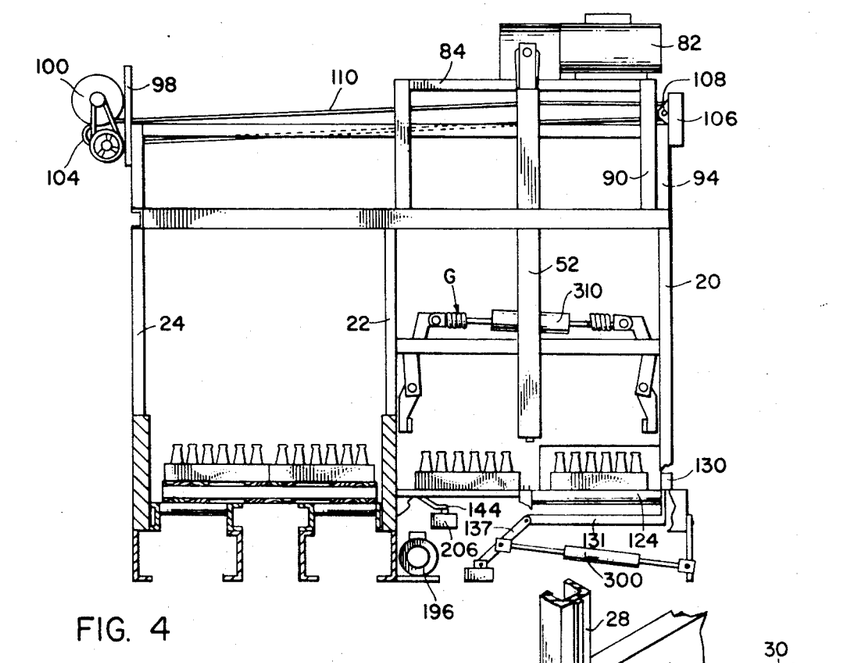
FIGURE 4 is a somewhat schematic end view partially in section and with parts broken away of the palletizer illustrated in FIGURE 1, but omitting the pallet magazine.

Referring more specifically to FIGURES 1 and 2, the preferred embodiment includes a stationary framework F which comprises six vertical steel channel supports 20, 22, 24, 26, 28, and 30 suitably attached to horizontal base members 32, 34, and 35, as by welding. Four horizontal braces 36, 38, 40 and 42 connect the upper ends of the vertical supports 20, 22, 24, 26, 28 and 30 to form a rectangular skeleton framework F.

Within the upper horizontal frame members 36, 38, 40 and 42, is provided a movable skeleton framework F' comprising horizontal members 44, 46, 48 and 50 adapted to reciprocate in a horizontal plane between the outer framework braces 36 and 40. The movable framework F' supports an inverted U-shaped assembly 51 including vertical legs 52 and 54 which depend from adjacent the mid points of opposed frame members 46 and 50 of the movable framework F'. The assembly 51 includes auxiliary channel-shaped leg members 56 and 58 attached to the inner sides of respective legs 52 and 54 with the channel legs of the auxiliary members 56, 58 facing inwardly. Auxiliary leg members 56, 58 are coextensive with the lengths of vertical legs 52, 54 and extend upward and beyond the movable framework members 46 and 50 to a point above the top of the framework F. The web 60 of the inverted U-shaped assembly 51 extends horizontally between the upper extremities of auxiliary legs 56 and 58.

A pick-up mechanism G is provided between auxiliary leg members 56 and 58 and comprises in part a rectangular framework consisting of horizontal side members 62, 64, 66, and 68. Vertically extending brackets 70 and 72 are suitably attached to the outer surface of opposed frame members 64 and 68 adjacent the mid point thereof, and are appropriately equipped with rollers or other bearing members, not shown, to ride along the trackway defined by the channel shaped members 56 and 58.

Chains or cables 74 and 76 are attached to respective brackets 70 and 72, and extend upwardly beside auxiliary legs 58, 56 and around sprockets 78 journaled above web 60 on upstanding arms 79. The sprockets 78 are fixed for rotation with a horizontal shaft 80 adjacent its ends; shaft 80 being suitably connected to electric motor 82 for rotation in both directions to selectively raise and lower the pick-up mechanism G. The motor 82 is secured to a horizontally extending support 84 which in turn is supported above opposed frame members 44 and 48 by means of angularly disposed braces 86, 88, 90, and 92.

A vertical control rod 440 (FIGURES 8 and 9) is attached to auxiliary leg 58 and extends along its entire length. Control rod 440 is provided with six transverse passageways 441 spaced evenly along the vertical extent of the rod, said passageways 441 receiving knock-out limit pins 442, the function of which is to be hereinafter described.

Pick-up mechanism G is also adapted to reciprocate horizontally as well as vertically, and toward this end there is provided a pair of arms 94 and 96 extending upwardly from the stationary, opposed, upper horizontal frame members 36 and 40. A mounting plate 98 is secured to upwardly extending arm 96, and a reversible, carriage traversing motor 100 having axle 101 is mounted thereon. A pulley 102 is operated by the rotation of the motor axle 101 and in turn activates sprocket 104 which is journaled for rotation upon plate 98. At the other end of the framework system F, plate 106 is secured to upstanding arm 94, to which is suitably journaled another sprocket 108. A chain 110 extends around sprockets 104 and 108, and each end of chain 110 is fastened to bracket 112 which is secured to the underside of horizontal web 60.

Horizontal side frame members 46 and 50 are suitably provided with rollers or wheels, not shown, which roll along the trackway formed by the inwardly facing lower flange of upper horizontal side members 38 and 42 of framework F.

In operation, the carriage traversing motor 100 actuates pulley 102, which in turn, causes sprocket 104 to rotate, advancing the chain or cable 110 in one direction or the other. Thereupon, as chain 110 moves in said direction the entire pick-up frame assembly F' including pick-up carriage G is caused to advance in the same direction.

Means are thus provided for horizontally moving the pick-up frame between the ends of the stationary framework F, and for vertical movement of the pick-up carriage G.

RECEIVING STATION

At one end of framework F, along the lower portion thereof and transverse to the horizontal reciprocating path of the pick-up frame assembly F', an incoming conveyor C delivers a single line of articles to be palletized such as cases S of bottled drinks from a bottling machine to receiving station 126. The conveyor line C is a standard roller type conveyor comprising two horizontally spaced side members 120 and 122 which secure therebetween the axles of a series of rollers 124 along which the cases roll toward receiving station 126. The incoming cases are initially separated at the receiving station into groups of three, alternate groups being shifted laterally onto a stationary platform 134 by a shifting mechanism to be more fully described hereinafter. The succeeding group of three cases is allowed to remain on the conveyor in juxtaposition to the first group to form a tier or layer of six cases to be loaded on a pallet.

Figure 7:
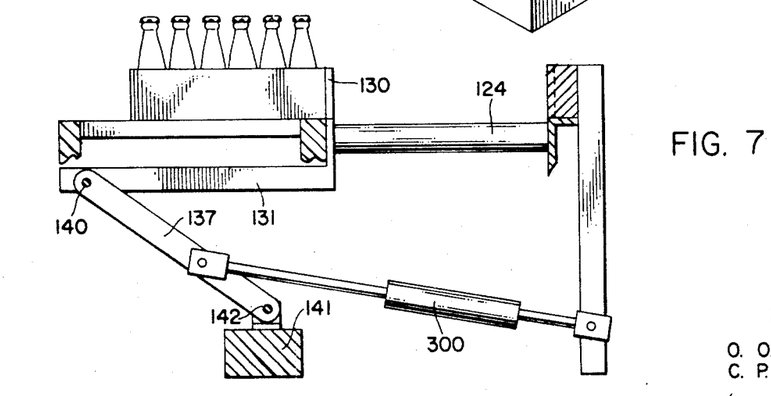
FIGURE 7 is a vertical sectional view taken substantially along the line 7—7 in FIGURE 6.

The shifting mechanism M, mentioned above, is best shown in FIGURES 4 through 7 and comprises three horizontally reciprocating laterally shiftable shoes 128, 130, and 132 which extend above the level of the rollers 124 for engagement with successive cases S in the receiving area 126. The shoes 128, 130, and 132 are rigidly secured by upstanding arms 127 to respective horizontal, reciprocating links 129, 131, and 133. The other ends of the horizontal links 129, 131, and 133 are pivotally attached to three generally downwardly extending levers 135, 137, and 139 respectively, which in turn are mounted for pivotal movement to a base member 141. Transverse connecting rods 140 and 142 extend through corresponding ends of downwardly extending lever arms 135, 137, and 139, so that when the central downwardly extending arm 137 is actuated by the piston of double acting air cylinder 300 the three downwardly extending levers 135, 137, and 139 all act in unison to pivot counterclockwise as shown in FIGURE 7. This movement causes horizontal links 129, 131, and 133 to shift laterally thus activating shoes 128, 130, and 132. The double acting air cylinder 300 returns the shoes 128, 130, and 132 to their original position to commence a new cycle.

Figure 5:
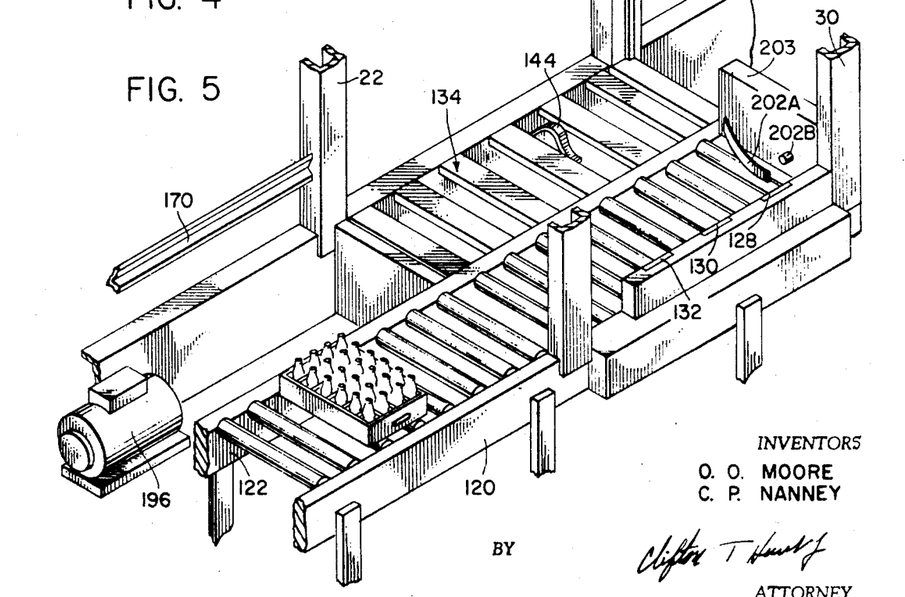
FIGURE 5 is a perspective view, with parts broken away and looking in the opposite direction from FIGURE 1, of the receiving station of the palletizer.
Figure 6:
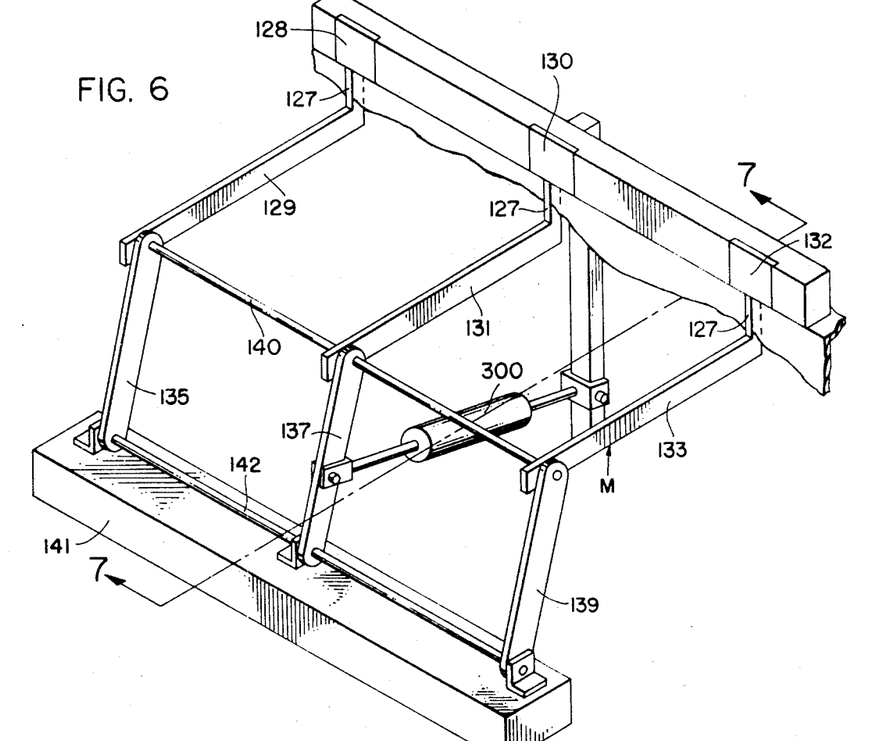
FIGURE 6 is a somewhat schematic perspective view showing the shifting apparatus at the receiving station for moving cases laterally from an incoming conveyor to a parallel adjacent area.

A limit switch 202 (FIGURE 5) including a spring biased arm 202A and an electrical contact element 202B are mounted on an abutment 203 at the end of the incoming conveyor line (FIGURE 5). When the incoming cases reach the end of the line, the first case of alternate groups engages switch arm 202A and closes the actuating circuit for the shifting mechanism M, moving the first group of cases laterally onto platform 134 as previously described. As the initial group of cases are shifted onto platform 134, one of them engages a spring biased switch element 144 which closes switch 206, reversing the flow of air in the double acting air cylinder 300 to return the shifting mechanism M to its original position. Switch 206, in the open position causes spring biased arm 202A and electrical contact element 202B, when engaged by the first group of cases, to complete the shifting mechanism circuit through switch 202, and alternately, in the closed position switch 206 causes spring biased arm 202A and electrical contact element 202B, when engaged by the second group of cases, to complete the carriage pickup circuit through switch 209.

PICK-UP CARRIAGE

As stated previously, pick-up mechanism G is attached for reciprocal vertical movement along upstanding leg members 56 and 58 to clamp and lift successive tiers of cases S from the receiving station 126 and transfer them to a pallet in the pallet loading area.

Figure 8:
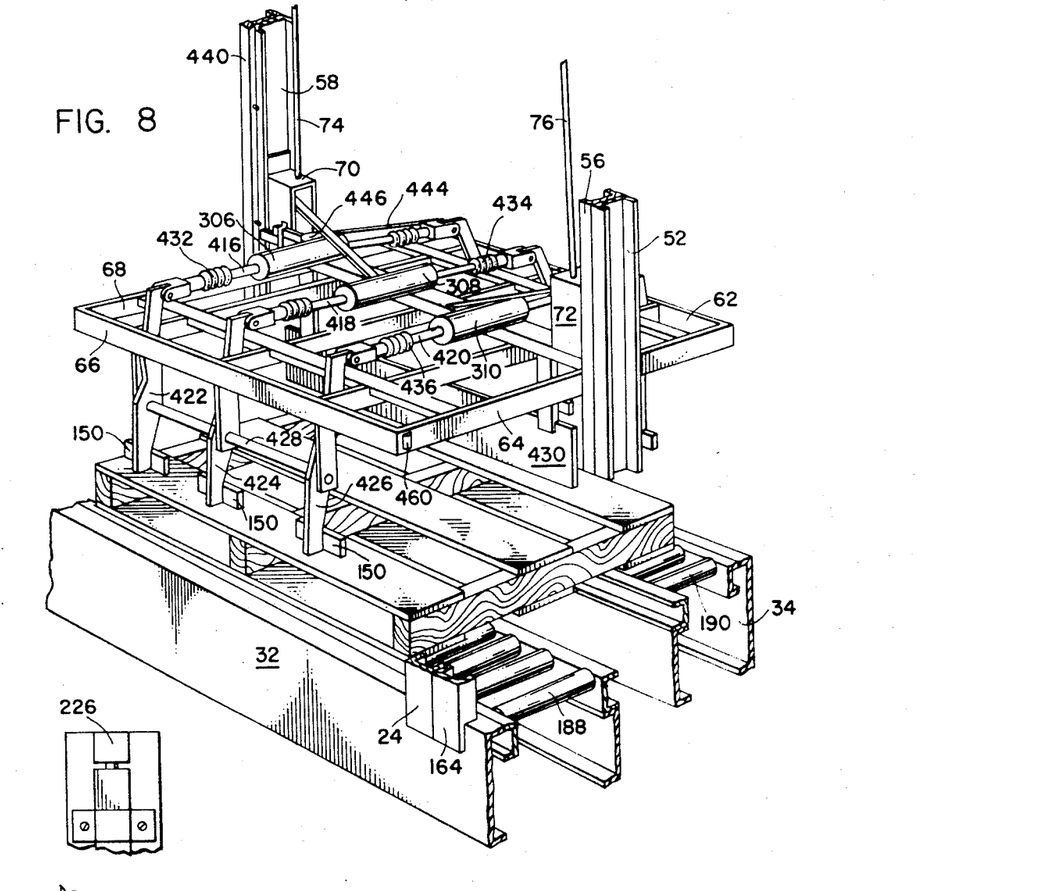
FIGURE 8 is a perspective view of the pick-up mechanism positioned above the pallet loading area.

As shown in FIGURE 8, double acting air cylinders 306, 308 and 310 are suitably positioned above the framework of the pick-up mechanism G and have the pistons thereof attached in cooperating relationship to the inner ends of drive rods 416, 418, 420, 416', 418' and 420'.

Therefore, it can be seen that upon actuation of the air cylinders, the resulting force urges the drive rods 416, 418, 420, 416', 418' and 420' against spring pressure in a direction also away from the air cylinders. Downwardly extending lever arms 422, 424 and 426 are pivotally attached to the other end of drive rods 416, 418 and 420. A transversely extending, stationary connecting rod 428 pivotally connects the central portions of said lever arms and provides a fulcrum therefor, so that upon outward movement of drive rods 416, 418 and 420, the lower ends of lever arms 422, 424 and 426 are forced inwardly or toward the air cylinders, thus exerting an inwardly directed pressure on the ends of the cases adjacent to the inner side of said lever arms. Transversely extending pads 150 are attached to the inner side of lever arms 422, 424 and 426 at the lower extremity thereof to provide a gripping surface, whereby the cases will not slip therefrom during the lifting step of the cycle. Upon inward movement of lever arms 422, 424 and 426 the first group of three cases will be gripped between pads 150 and median plate 430 which is attached along the medial portion of the lower side of pick-up frame G and extends between the two groups of cases during the pick-up operation. Another set of driving rods 416', 418' and 420' and lever arms 422', 424' and 426' are correspondingly disposed on the other side of the pick-up mechanism G to operate in a similar manner as a result of the outward movement of the pistons from the rear of air cylinders 306, 308 and 310. Therefore, it can be seen that, upon actuating the air cylinder 306, the first group of three cases is clamped between lever arms 422, 424, 426 and median plate 430, and the second group of three cases is similarly clamped against the other side of median plate 430.

Upon release of the air pressure from cylinders 306, 308 and 310, the drive rods 416, 418 and 420 are returned to their original position due to spring pressure from compression springs 432, 434 and 436 which are suitably positioned along drive rods 416, 418 and 420 and tend to urge the drive rods back to their original position. This action releases the pressure previously exerted on the sides of the soft drink cases and allows them to drop into position upon a pallet. Simultaneously, drive rods 416', 418' and 420' are returned to their original positions in a like manner and release the other cases.

Figure 9:
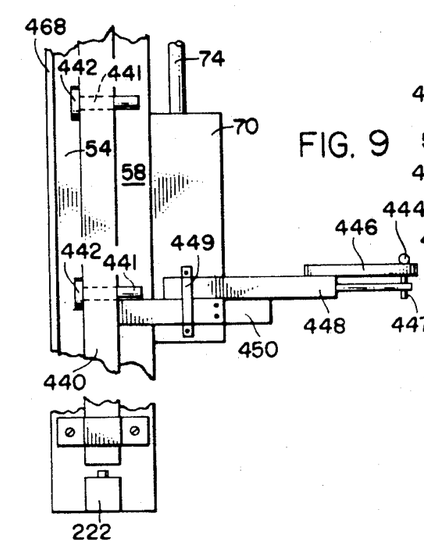
FIGURES 9, 9A and 9B are enlarged fragmentary somewhat schematic and sequential elevation views illustrating successive positions of the control mechanism for the pick-up apparatus during the cycle of the pick-up apparatus in transporting a course of cases from the receiving station to the pallet loading area, depositing the cases on a pallet, and returning to the receiving station for another course of cases.
Figure 9A:
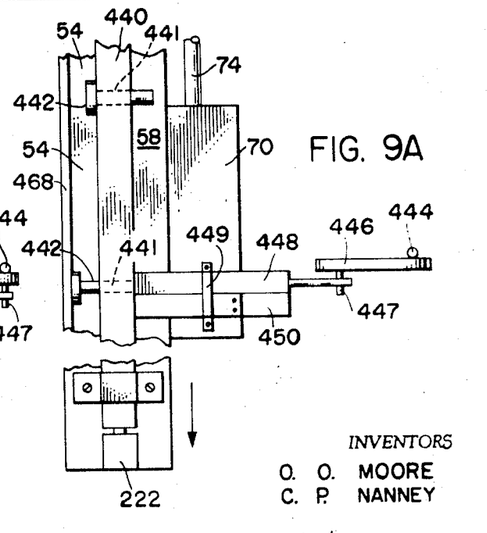
Figure 9B:
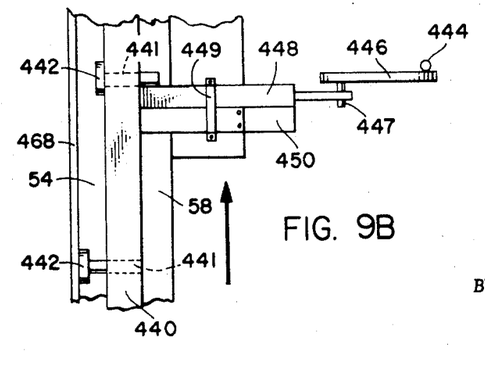

An indexing mechanism most clearly seen in FIGURES 9, 9A and 9B is also provided whereby the pick-up carriage is raised only to the elevation necessary to clear the previous course or tier of cases placed upon the pallet in the pallet loading area.

The indexing system comprises a vertically extending control rod 440 attached to one side of upstanding auxiliary leg 58. A plurality of equally spaced limit pins 442 extend transversely through suitable passageways 441 in said rod 440, and one limit pin is provided for each layer or tier of cases to be stacked.

A circular disc 446 is mounted for reciprocal pivotal movement in a horizontal plane in the area adjacent bracket 70. A drive rod 444 is attached at one end to the upper end of lever arm 422' and adapted to be responsive to the reciprocal movement of the mechanical linkage between the drive rod 416' and downwardly extending lever arm 422' and is attached at the other end to the upper surface of disc 446 at the side opposite bracket 70. A pin 447 depends from disc 446 at a point spaced arcuately from 90° from the point of attachment of the drive rod 444 to the disc 446. The pin 447 loosely penetrates one end of a reciprocable knock-out bar 448 which is slidably received by a U-shaped guide 449 secured to the side of bracket 70. The other end of knock-out bar 448 is positioned to engage the side of control rod 440 at the outer extent of its reciprocal movement. The disc 446 responds to the reciprocal movement of connecting rod 444 and is thus caused to reciprocally pivot through approximately a 90° angle. This pivotal movement urges knock-out bar 448 into and out of engagement with the side of control rod 440 and corresponding limit pins 442. A stationary member 450 is also secured to the side of bracket 70 parallel to and immediately beneath reciprocable knock-out bar 448 for supporting the control rod 440 through engagement with the underside of limit pins 442.

Vertical control rod 440 is suitably supported against the side of channel 58, however, it is free to reciprocally slide a slight distance up and down channel member 58. A limit switch 222 is spaced slightly below the lower end of rod 440, and a forward-reverse limit switch 226 is positioned slightly above the upper end of control rod 440. Upon upward movement of control rod 440, forward-reverse switch 226 is contacted which actuates motor 100 to traverse the pick-up mechanism. Downward movement of control rod 440 engages switch 222 which actuates motor 82 to lift the pick-up carriage.

A second vertical control rod 456 is supported to reciprocally slide up and down leg 58 into and out of engagement with a lower limit switch 458. However, on this control rod 456, there are no limit pins as there are on rod 440.

In the receiving station area 126, a micro-switch 216 is suitably positioned and adapted to be engaged by a pin 462 on the pick-up carriage upon lowering preparatory to gripping the incoming cases.

Thus, the pick-up carriage G operates in the following manner beginning at its original position above the receiving station 126. All of the limit pins 442 are preset extending through control rod 440 as shown in FIGURE 9. Upon receiving a signal from the switch 212 in the conveyor receiving station 126, an unlocking coil 214 is actuated which energizes lift motor 82 to lower the pick-up carriage G to its lower position at receiving station 126. At the lower extent of the pick-up carriage movement, pin 462 on the pick-up frame actuates a micro-switch 216 which in turn activates the clamping mechanism to clampingly engage the cases at the receiving station in the manner previously described.

A pressure switch 218 is interposed in air line 312 (FIGURE 14) and is operable to activate the lift motor 82 which elevates the pick-up frame when sufficient pressure has been applied to clamp a group of cases.

At this time knock-out bar 488 is in the retracted position, shown in FIGURE 9, because of the pivotal movement of circular disc 446 resulting from the movement outwardly of connecting rod 444. The pick-up carriage continues its upward movement until the upper surface of stationary member 450 engages the underside of the first limit pin 442 which is in its preset position extending through vertical control bar 440. The pick-up carriage continues its upward movement with the stationary bar 450 lifting the control rod 440 out of contact with lower limit switch 222 into contact with the upper forward-reverse limit switch 226. This shuts off the vertical lift mechanism and actuates the horizontal traverse mechanism to move the pick-up frame to the other end of the framework F. When the carriage reaches a position above the stacking station 153, it stops at the limit of its path causing an adjustable clutch to slip in the motor 100, which in turn actuates a switch 232 to turn off motor 100. Horizontal movement of the carriage to the stacking station 153 also trips a valve 304 releasing the air pressure in the clamping mechanism G and allowing the six soft drink cases to drop into position either on the pallet or on the tier of cases directly beneath.

Upon release of the air pressure, connecting rod 444 is returned to its inner position and rotates control disc 446, pivoting it sufficiently to cause knock-out bar 448 to be moved into engagement with control rod 440. The knock-out bar 448 as shown in FIGURE 9A forces the pin 442 back through the passageway 441 in control rod 440 and out of contact with the stationary bar, allowing the control rod 440 to drop, thus contacting the lower limit switch 222. The lower limit switch actuates lift motor 82 to lift the pick-up carriage and it continues its upward movement causing the upper surface of knock-out bar 448 to engage the next present limit pin shown in FIGURE 9B. The carriage moves slightly upwardly after contact with the limit pin 442, lifting control rod 440 into contact with the upper forward-reverse limit switch 226. This actuates the horizontal traverse mechanism to move the carriage to the other side of the framework, where it stops and the cycle begins again.

After six courses or tiers of cases are loaded upon a pallet and the pick-up mechanism is traversing back towards the receiving station 126, a lug 460 secured on the edge of pick-up frame member 64 at one end thereof contacts a limit switch 463 which is secured to the outer frame member 38. Lug 460 and switch 463 are so positioned that when lug 460 contacts switch 463, the pick-up mechanism will have cleared the path through which the loaded pallet will travel on its way out of the stacking station. This actuates the pallet reloading mechanism which will be hereinafter described.

A suitable means is also provided for resetting the limit pins 442 after each loaded pallet is removed and before the first cycle of loading the empty pallet. A vertically extending, pivotally mounted plate 468 is electrically or manually operated so as to move against and reset all of the limit pins 442 simultaneously while the pick-up mechanism is at its lowest extent picking up the first course or tier of cases to be loaded on the empty pallet.

PALLET MAGAZINE

Figure 10:
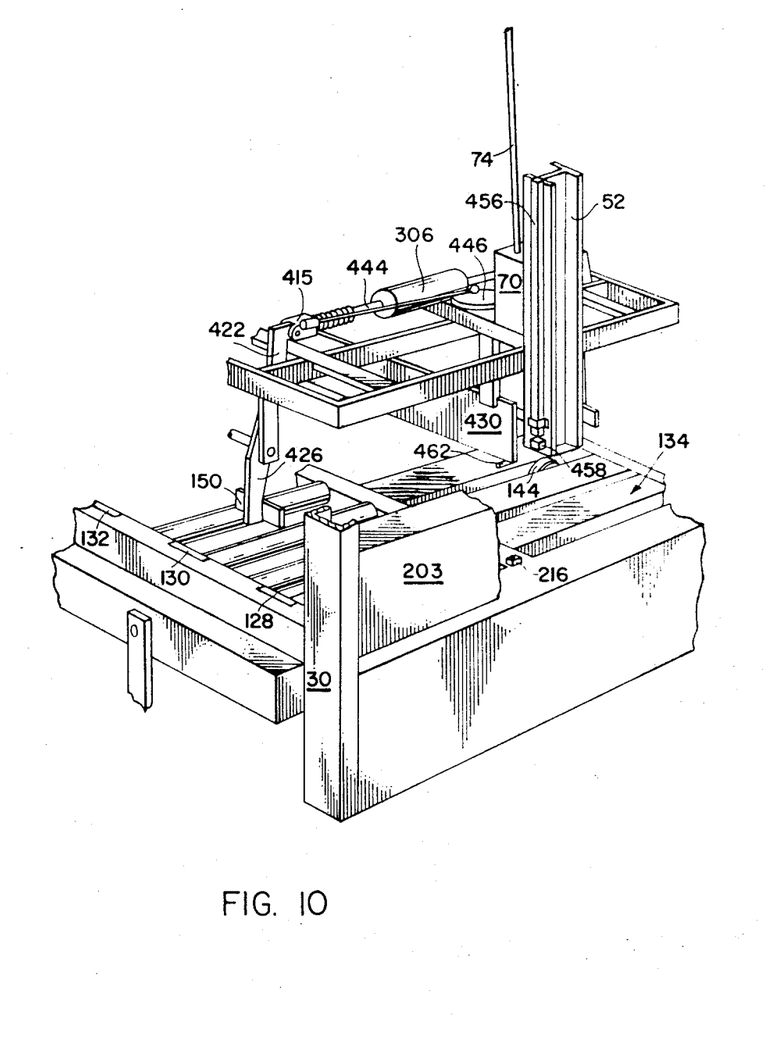
FIGURE 10 is a partial perspective view of the pick-up mechanism looking at the opposite direction from FIGURE 8.

Pallet magazine M comprises four vertically positioned legs 160, 162, 164 and 166 (FIGURE 10) secured to base members 32 and 34 adjacent the pallet loading area of framework F and are joined on three sides by upper horizontal brace members 168, 170 and 172 to form a pallet crib. One side of the pallet magazine is left open to facilitate loading. Further reinforcing members may be included as desired to strengthen the sides of the crib.

Inwardly extending dogs 174 and 176 are secured to horizontal actuating bar 184 which in turn is journaled between upstanding legs 164 and 166. One end of lever 185 is secured to one end of actuating bar 182 which extends through leg 166. Air cylinder 187 is secured to the rear side of the pallet magazine and has the free end of its piston pivotally attached to the other end of lever 185.

Horizontal connecting rod 184 is correspondingly disposed on the opposite side of the pallet magazine from rod 182, however, rod 184 is not mechanically connected to legs 160 and 162. Rather, each end of horizontal rod 184 bears against one of compression springs 179 and 181, which are seated in spring housings 179' and 181', suitably secured to the framework of the pallet magazine. A second horizontal rod 184' is journaled between leg members 160 and 162 and positioned parallel to rod 184 and slightly spaced below and outwardly therefrom. Pivotal members 178 and 180 have passageways at each end through which they are pivotally attached to rods 184 and 184'. Each of pivotal members 178 and 180 include inwardly directed dogs 178' and 180', respectively, (FIGURE 2) which are adapted to successively engage the sides of a pallet in the magazine.

The pallets are loaded into the magazine M so that the lowermost pallet rests upon a reciprocal, horizontally extending supporting beam 186 between upstanding pivotal brackets 192 and 194. A pair of roller conveyors 188 and 190 provide additional support for the lowermost pallet and extend parallel to said beam 186 from beneath the pallet loading magazine, into the stacking station 153, and out the other side thereof to the dispach area D.

When the loading of a pallet has been completed in the stacking station, as previously described, the switch 463 on the upper horizontal portion of framework F is tripped by lug 460 on the pick-up mechanism framework to energize motor 196. Motor 196 is secured to the framework of the pallet magazine and reciprocally operates a chain drive connected to the horizontally movable supporting beam 186.

As supporting beam 186 begins its horizontal motion toward the stacking station, bracket 194 urges lowermost empty pallet out of the pallet magazine M and into the stacking station. At the same time, bracket 192 urges the loaded pallet out of the stacking station 153 to the dispatch area D to await removal by a lift truck.

When the pallet reaches its desired position, the motor 196 reverses and starts the beam 186 along its return path. Thereupon bracket 192 is pivoted 90° so that it is lying flush with beam 186, and may be returned underneath the newly positioned pallet to its original position.

Figure 11:
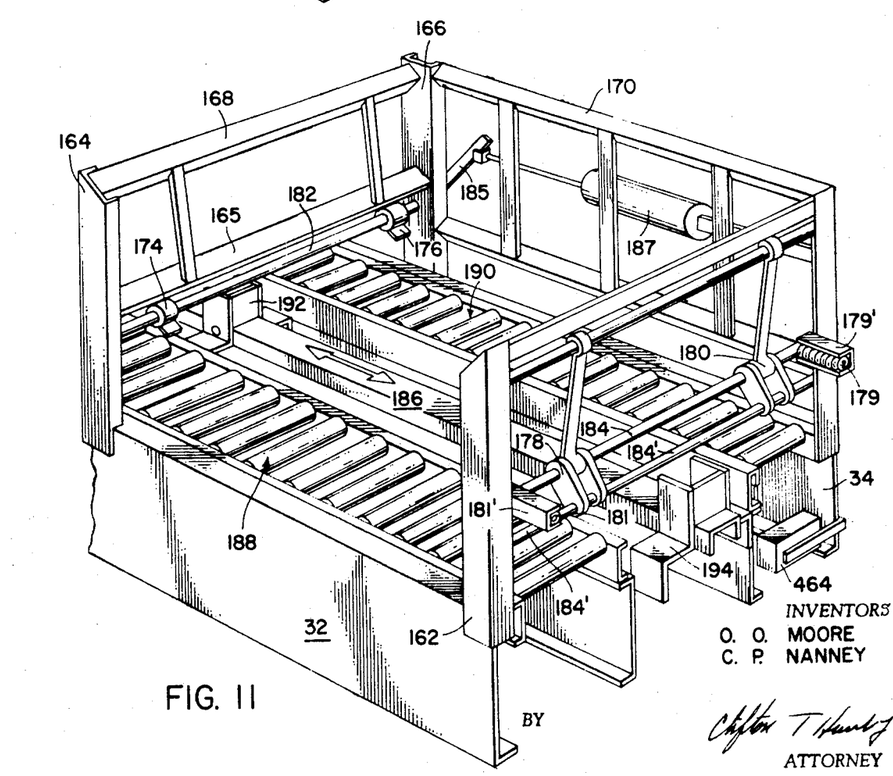
FIGURE 11 is an enlarged perspective view of the pallet magazine omitting the remainder of the apparatus and looking in the direction of FIGURE 1.
Figure 12:
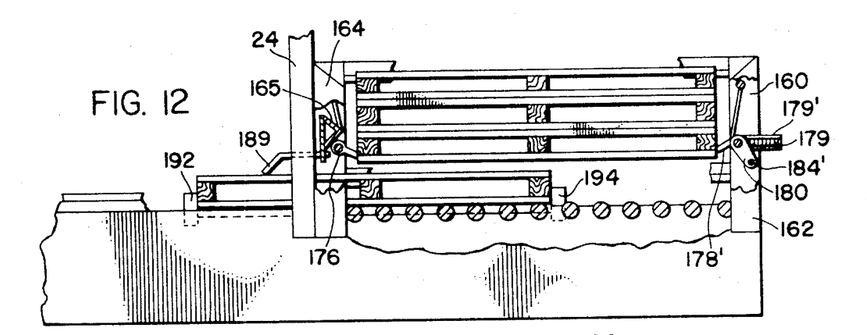
FIGURE 12 is an elevation view partially in section looking at the left side of FIGURE 11 and with parts broken away illustrating the movement of a pallet from the pallet magazine into the pallet loading area.

A pair of curved, pivotally mounted follower arms 189, shown in FIGURES 8, 11 and 12 extend downwardly from one of the horizontal bracing angles 165 into the stacking station. As an empty pallet is moved into the loading area, the arms 189 are caused to pivot upwardly and ride over the top surface of the pallet (FIGURE 12). When the empty pallet is moved past the arms, they drop to a level slightly below the top surface of the pallet (FIGURE 13), so that when motor 196 reverses and moves the support beam 186 back toward the pallet magazine, arms 189 provide a stop means to position the empty pallet in the stacking station and prevent its return to the pallet magazine.

Figure 11A:
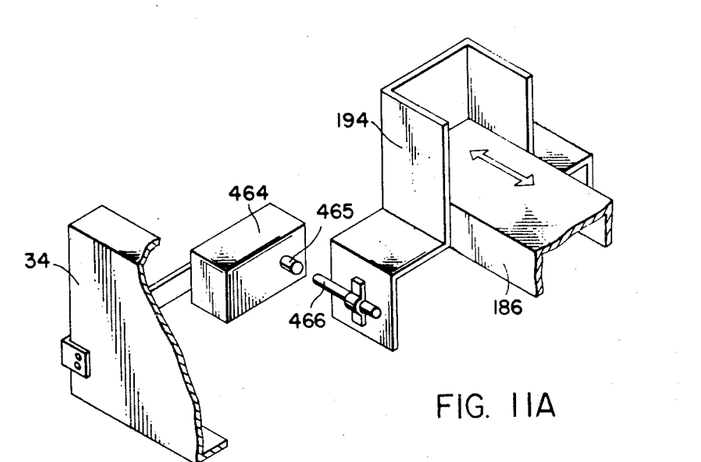
FIGURE 11A is an enlarged fragmentary exploded view of the pallet control switch circled in FIGURE 11 and rotated 180°.

During the positioning of the empty pallet, it is desirable to remove the force exerted by the weight of the other pallets on the lowermost pallet. To this end, the pallet magazine is provided with a limit switch 464, shown in FIGURE 11A, which is normally closed when the beam 186 is in its original position beneath the pallet magazine. As the suport beam 186 begins its traversing movement, a pin 466 on bracket 194 is caused to move out of engagement with contact 465 of switch 464. The switch is then opened and actuates air cylinder 187, which in turn rotates lever 185 in a manner causing pivotal dogs 174 and 176 to pivot into bearing relationship against the sides of the pallet next above the lowermost pallet being moved.

The dogs 174 and 176 continue to pivot upwardly forcing the pallet against opposing dogs 178' and 180'. As the pallet is forced against the dogs 178' and 180', the horizontal rod 184 pivots upwardly and around rod 184' using the brackets 178 and 180 as lever arms actually lifting the pallet and removing the weight of the stack of pallets from the lowermost pallet. Therefore, it can be seen that when the lowermost pallet is moved into the stacking station, it is free from all weight of the pallets above.

When beam member 186 returns, pin 466 again is brought into engagement with contact 465 of limit switch 464, closing the switch which releases the pressure in air cylinder 187 causing pivotal dogs 174 and 176 to be pivoted in an opposite direction to their first movement; that is, they pivot downwardly and release the stack of pallets, so that they again rest upon horizontal support beam 186 and rollers 188 and 190.

DESCRIPTION OF ELECTRICAL OPERATION

Figure 13:
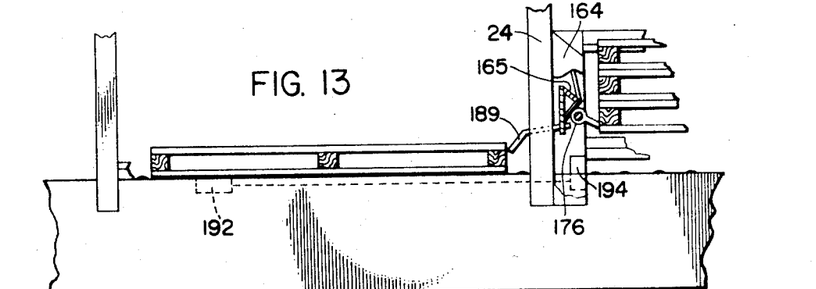
FIGURE 13 is a view similar to FIGURE 12 looking at both the loading area and the pallet magazine and showing the pallet traversing mechanism returning to the pallet magazine after depositing a pallet at the loading area.
Figure 14:
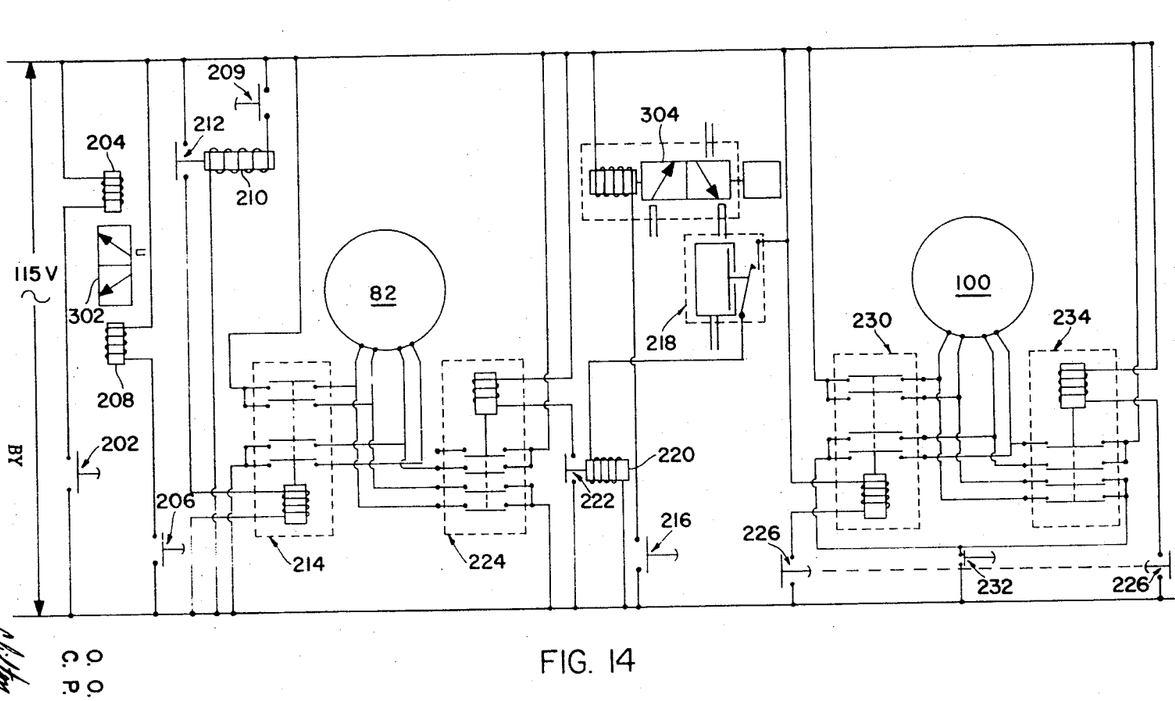
FIGURE 14 is a schematic diagram of the electrical components of the palletizing apparatus.
Figure 15:
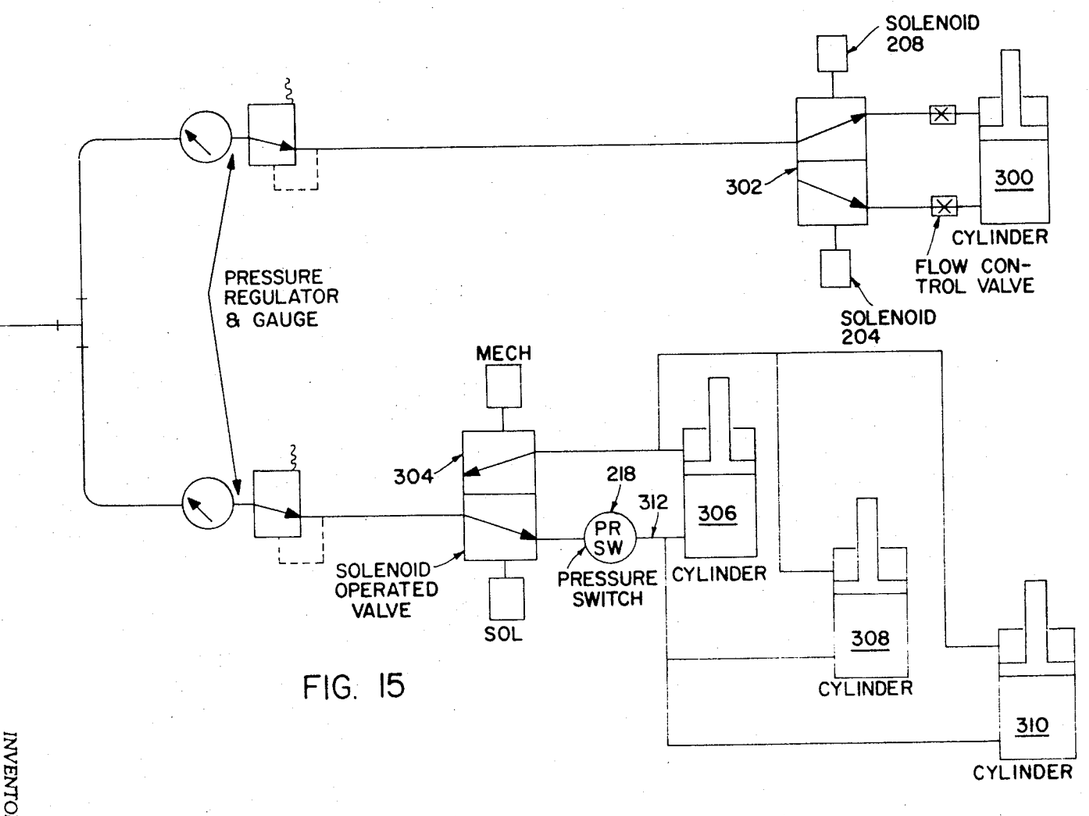
FIGURE 15 is a schematic diagram of the pneumatic components of the palletizing apparatus.

In describing this phase of the operation and referring to FIGURES 13 and 14, it is presumed that the pick-up carriage G is positioned directly above the receiving station 126. A first group of three cases enters receiving station 126 and trips switch 202, which energizes solenoid 204 of valve 302, causing air cylinder 300 to actuate the shifting mechanism M to shift the first group of cases over onto the stationary platform 134. At the end of its stroke, the shifting mechanism closes switch 206 which energizes solenoid 208 of valve 302 and reverses the air in cylinder 300 returning the shifting mechanism M back to its original position. The closing of switch 206 holds switch 202 in the open position preventing switch 202 and valve 302 with solenoids 204 and 208 from cycling when the second group of three cases is moved into position. Therefore, the switch 202 does not actuate the shifting mechanism M to push this group of cases over into the position occupied by the first group of cases.

The closing of switch 206 which holds switch 202 in the open position does allow switch 209 to be tripped by the incoming second group of cases, whereupon switch 209 actuates solenoid 210 which, by lifting a mechanical linkage, trips switch 212. Switch 212 energizes relay 214 which in turn actuates motor 82 to bring the pick-up frame G downward. When the pick-up frame reaches the bottom of its travel, it engages switch 216 which in turn energizes solenoid operated valve 304, and the resulting air pressure flowing through valve 304 from air cylinders 306, 308 and 310 actuates the clamping members 150 to clamp the six cases comprising the first and second groups between gripping members 150 and median plate 430.

The building pressure in the air line 312 energizes pressure switch 218 which in turn energizes solenoid 220 causing control rod 456 to drop into engagement with limit switch 458, thus energizing relay 224 to reverse the direction of motor 82 and lift the pick-up frame. As the pick-up frame G moves upwardly, it forces a preset limit pin 442 to lift the control rod 440 which de-energizes switch 222 stopping motor 82. When the control rod is lifted, forward-reverse limit switch 226 is engaged releasing a lock thereon and moving it to its forward position by spring pressure. This opens the circuit through relay 230 to motor 100, and traverses the carriage G toward the stacking station 153.

When the pick-up frame reaches a point directly above the stacking station, it is stopped causing an adjustable clutch to slip which actuates switch 232 turning motor 100 off. Reverse spring pressure causes the forward-reverse switch 226 to return to a neutral position. The pick-up frame upon its arrival at the stacking station also trips solenoid operated valve 304 releasing the clamping air pressure and de-energizing pressure switch 218 which in turn de-energizes solenoid 220.

As the clamping pressure is released the limit pin resetting mechanism causes the control rod 440 to drop into engagement with switch 222 which activates motor 82 to raise the pick-up frame until the reset limit pin 442 is engaged and the control rod 440 is raised de-energizing switch 222 and motor 82. When the control rod is raised it engages upper forward-reverse switch 226 which in turn is moved to the reverse position causing motor 100 to move the carriage G back to the original position above the receiving area 126. When the pick-up frame reaches the limit at a point above the receiving station, the frame stops activating the adjustable clutch and de-energizing switch 232 which in turn shuts off motor 100.

The pick-up frame is now in the original position ready to start a new cycle, more groups of cases arrive from the bottling machine, and the previous cycle is repeated. After recycling several times to load a pallet six tiers high, a switch 463 is tripped by an outwardly projecting boss 460 on the pick-up frame energizing motor 196 to move the loaded pallet to the dispatch area D and an empty pallet to the stacking station 153.

SUMMARY OF MECHANICAL OPERATION

In operation the pick-up carriage is positioned directly above the receiving station 126 which receives an incoming line of soft drink cases from the conveyor system C. When three cases have been received, the shifting mechanism shifts the three cases over to an adjacent position allowing three more cases to be received in the first position, whereupon the pick-up frame lowers to a position wherein the clamping elements are activated to bear against the sides of the soft drink cases sufficiently to hold them therebetween.

The lift motor then reverses itself and lifts the pick-up frame to an elevation sufficient to clear the pallets, whereupon the lift motor 82 is shut off and the carriage traversing motor 100 is activated to shift the pick-up framework longitudinally to the other end of framework F, whereupon the cases are released and form one course or tier of soft drink cases stacked upon the pallet. The pick-up frame is then raised and moved back to its original position above the receiving station 126, whereupon the cycle is repeated until six or any desired number of cases are built upon pallet 154.

The pallet loading mechanism is then activated to move the loaded pallet out of one end of the palletizing machine framework and at the same time to replace loaded pallet 154 with an empty pallet from the pallet magazine M. Although the description describes the use of six cases in each layer, and six tiers on a loaded pallet, it is within the scope of the invention to vary both the number of cases in a layer and the number of layers on a loaded pallet.

Therefore it may be seen that a machine has been provided for automatically receiving successive cases from an incoming conveyor, automatically removing cases from the incoming conveyor, transferring them to a pallet, and then ejecting a loaded pallet from the loading area positioning a new pallet therein.

In the drawings and specification there have been set forth preferred embodiments of the invention and, although specific terms are employed, they are used in a generic and descriptive sense only and not for purposes of limitation, the scope of the invention being defined in the claims.

We claim:
1. A pallet-loading apparatus for transferring packages from an incoming line of packaged goods comprising a receiving station, a pick-up carriage, a pallet-stacking station, and a pallet magazine:
   (a) said receiving station including a means for breaking down said incoming line of packages into first and second groups forming a tier, each group comprising that number of packages which make up one side of said tier, said means comprising:
      (i) an incoming conveyor having a shifting mechanism adjacent the end thereof and adjacent one side of the packages when each of said groups is formed;
      (ii) a first electrical circuit controlling said shifting mechanism and a second electrical circuit activating said pick-up carriage;
      (iii) a first switch so positioned at the end of said incoming conveyor line as to be actuated by said incoming packages, said first switch having a first function of activating said shifting mechanism when connected into said first circuit, said first switch having a second function of activating said pick-up carriage when connected into said second circuit;
      (iv) said shifting mechanism comprising shifting elements and an air cylinder, said air cylinder operatively connected to said first switch and to said first circuit;
      (v) said shifting elements operatively connected to the piston of said air cylinder and movable therewith;
      (vi) a platform adjacent and parallel to the end of said conveyor line, whereby activation of said first switch by the leading package of said first group of packages energizes the piston of said air cylinder to move the shifting elements against the sides of the first group of packages to shift them over to said parallel platform;
      (vii) a second switch so positioned on said parallel platform as to be actuated by said first group of packages when they are shifted over by said shifting elements, said second switch alternately connecting said first switch into said first and second circuits; and
      (viii) said second switch, upon being closed by said first group of packages, connecting said first switch into said second circuit, whereupon when said first switch is activated by the leading package of said second group of packages, the pick-up carriage is lowered to engage said first and second groups of packages;
   (b) said pick-up carriage including:
      (i) reciprocal lifting means for alternately elevating and lowering said pick-up carriage;
      (ii) gripping means for holding said first and second groups of packages therebetween in a clamped position during the lifting operation of said pick-up carriage;
      (iii) reciprocal traversing means for alternately traversing the pick-up carriage between a position above said pallet-stacking station and a position above said receiving station;
      (iv) means for releasing said groups of packages onto a pallet positioned in the pallet-stacking station area; and
   (c) said pallet magazine being located immediately adjacent said pallet-stacking station and including means for replacing a completely loaded pallet in the pallet-stacking station with an empty pallet from the pallet magazine upon the sensing of a completed load condition.

2. A pallet-loading apparatus according to claim 1 wherein said gripping means on said pick-up carriage comprise pneumatically operated clamping pads which engage the ends of the packages in said first and second groups and hold them therebetween while the pick-up carriage is elevated above the level of the receiving station.

3. A pallet-loading apparatus according to claim 1 wherein said reciprocal lifting means comprises a reversible motor, and a vertically extending chain operatively connecting said reversible motor with said pick-up carriage to raise and lower said pick-up carriage.

4. A pallet-loading apparatus according to claim 3 wherein said reciprocal traversing means includes a second reversible motor and a horizontally extending chain operatively connected to said pick-up carriage for moving the pick-up carriage back and forth along a horizontal plane.

5. A pallet-loading apparatus according to claim 4 wherein said pick-up carriage further includes a control system comprising a vertically reciprocal control rod movable between contact with a lower switch and an upper switch, said lower switch when activated causing said pick-up carriage to lift and said upper switch when activated causing said pick-up carriage to traverse horizontally, a series of horizontally movable limit pins spaced vertically along said control rod and extending horizontally therethrough, the spacing of said pins from one another being approximately equal to the height of one of said packages, a vertically movable, horizontally stationary member mounted on said pick-up carriage adjacent the side of said control rod through which said pins protrude in the set position, means responsive to the release of air pressure to release said packages onto a pallet in the pallet stacking station for moving one of said limit pins out of contact with said horizontally stationary member causing said control rod to drop into engagement with said lower switch activating said first reversible motor to lift said pick-up carriage, said stationary member bearing against the lower surface of one of said pins to lift said control rod out of engagement with said lower switch and into engagement with said upper switch causing said pick-up carriage to traverse toward said receiving station, and means for resetting the limit pins after a pallet is fully loaded.

6. The pallet-loading apparatus according to claim 1 wherein the means for replacing a completely loaded pallet in the pallet-stacking station with an empty pallet and the pallet magazine upon the sensing of a completed load condition comprises a control means for sensing a completed load condition, said control means activating a pallet lifting means.

References Cited

UNITED STATES PATENTS

| | | | |
|---|---|---|---|
| 2,508,861 | 5/1950 | Jessen | 214—6 |
| 2,598,222 | 5/1952 | Cahners et al. | 214—6 |
| 2,716,497 | 8/1955 | Wahl et al. | 214—6 |
| 2,827,999 | 3/1958 | Raynor | 198—34 |
| 2,947,405 | 8/1960 | Fenton | 214—6 X |
| 3,270,897 | 9/1966 | Lingl | 214—6 |
| 3,303,942 | 2/1967 | Thomas et al. | 214—6 |

FOREIGN PATENTS

| | | |
|---|---|---|
| 585,353 | 11/1958 | Italy. |
| 964,411 | 7/1964 | Great Britain. |

GERALD M. FORLENZA, Primary Examiner

R. E. SPAR, Assistant Examiner